(12) United States Patent
Ljesic et al.

(10) Patent No.: US 9,382,383 B2
(45) Date of Patent: *Jul. 5, 2016

(54) COMPOSITION COMPRISING BLOCK COCONDENSATES OF PROPYLFUNCTIONAL ALKALINE SILICONATES AND SILICATES, AND METHOD FOR THE PRODUCTION THEREOF

(71) Applicants: Spomenko Ljesic, Rheinfelden (DE); Christopher Studte, Freiburg (DE); Helmut Mack, Traunstein (DE)

(72) Inventors: Spomenko Ljesic, Rheinfelden (DE); Christopher Studte, Freiburg (DE); Helmut Mack, Traunstein (DE)

(73) Assignee: Evonik Degussa GmbH, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/358,437

(22) PCT Filed: Oct. 30, 2012

(86) PCT No.: PCT/EP2012/071483
§ 371 (c)(1),
(2) Date: May 15, 2014

(87) PCT Pub. No.: WO2013/072185
PCT Pub. Date: May 23, 2013

(65) Prior Publication Data
US 2014/0330035 A1    Nov. 6, 2014

(30) Foreign Application Priority Data
Nov. 15, 2011 (DE) .......................... 10 2011 086 362

(51) Int. Cl.
| | | |
|---|---|---|
| C07F 7/04 | (2006.01) | |
| C08G 77/16 | (2006.01) | |
| C04B 24/42 | (2006.01) | |
| C08G 77/42 | (2006.01) | |
| C08L 83/10 | (2006.01) | |
| C08G 77/06 | (2006.01) | |
| C04B 28/14 | (2006.01) | |
| C04B 103/00 | (2006.01) | |
| C04B 103/65 | (2006.01) | |
| C04B 111/27 | (2006.01) | |

(52) U.S. Cl.
CPC ................ *C08G 77/16* (2013.01); *C04B 24/42* (2013.01); *C04B 28/14* (2013.01); *C08G 77/06* (2013.01); *C08G 77/42* (2013.01); *C08L 83/10* (2013.01); *C04B 2103/0061* (2013.01); *C04B 2103/65* (2013.01); *C04B 2111/27* (2013.01)

(58) Field of Classification Search
USPC .......................................... 556/450, 463, 470
See application file for complete search history.

(56) References Cited

U.S. PATENT DOCUMENTS

| 3,849,357 | A | 11/1974 | Wolf et al. |
|---|---|---|---|
| 5,282,998 | A | 2/1994 | Horn et al. |
| 5,932,757 | A | 8/1999 | Standke et al. |
| 6,649,569 | B2 | 11/2003 | Hirsbrunner et al. |
| 6,685,766 | B2 | 2/2004 | Standke et al. |
| 6,767,982 | B2 | 7/2004 | Standke et al. |
| 6,770,327 | B2 | 8/2004 | Edelmann et al. |
| 6,780,955 | B2 | 8/2004 | Barfurth et al. |
| 6,841,197 | B2 | 1/2005 | Standke et al. |
| 7,939,616 | B2 | 5/2011 | Barfurth et al. |
| 8,147,918 | B2 | 4/2012 | Standke et al. |
| 8,394,885 | B2 | 3/2013 | Friedel et al. |
| 8,481,654 | B2 | 7/2013 | Edelmann et al. |
| 8,679,247 | B2 | 3/2014 | Friedel et al. |
| 8,741,038 | B2 | 6/2014 | Friedel et al. |
| 2011/0207852 | A1 | 8/2011 | Lin |
| 2013/0040058 | A1 | 2/2013 | Friedel et al. |
| 2013/0085210 | A1 | 4/2013 | Friedel et al. |
| 2013/0087080 | A1 | 4/2013 | Friedel et al. |
| 2013/0092052 | A1 | 4/2013 | Friedel et al. |
| 2013/0284071 | A1 | 10/2013 | Friedel et al. |
| 2014/0182487 | A1 | 7/2014 | Friedel et al. |

FOREIGN PATENT DOCUMENTS

| EP | 0 650 968 A1 | 5/1995 | |
|---|---|---|---|
| WO | WO 02/083808 A2 * | 10/2002 | ............... C09K 3/18 |
| WO | WO 2011/038956 A1 | 4/2011 | |
| WO | WO 2011/128127 A1 | 10/2011 | |
| WO | WO 2011/128129 A1 | 10/2011 | |
| WO | WO 2012/139803 A1 | 10/2012 | |
| WO | WO 2012/139804 A1 | 10/2012 | |

OTHER PUBLICATIONS

International Search Report issued Feb. 14, 2013, in PCT/EP2012/071483.
"Silicons"—Difference between revisions Wikipedia [online] Nov. 8, 2011, 9 pages with English translation.
U.S. Appl. No. 14/629,177, filed Feb. 23, 2015, Studte, et al.
Chimicheskya encyklopedia: v 5 t. / Gl. Red. N.S. Zefirov.—M.: Sov. Encycl.; Bolshaya Ros. Encycl., 1995.—T.4.-s. 339-340 [Chemische Enzyklopaedie in 5 Baenden, Redaktionsleiter N.S. Zefirov, Sowjetische Enzyklopaedie; Broβe Russische Enzyklopaedie, 1995, Band 4, Seiten 339-340] w/ partial English translation.

* cited by examiner

*Primary Examiner* — Pancham Bakshi
(74) *Attorney, Agent, or Firm* — Oblon, McClelland, Maier & Neustadt, L.L.P.

(57) ABSTRACT

The invention relates to a composition and a method for the production of the composition comprising block cocondensates of propylfunctional alkaline siliconates and silicates.

15 Claims, No Drawings

COMPOSITION COMPRISING BLOCK COCONDENSATES OF PROPYLFUNCTIONAL ALKALINE SILICONATES AND SILICATES, AND METHOD FOR THE PRODUCTION THEREOF

This application is a National Stage of PCT/EP12/071483 filed Oct. 30, 2012 and claims the benefit of DE 10 2011 086 362.1 filed Nov. 15, 2011.

The invention relates to a composition and to a process for preparing the composition comprising block cocondensates of propyl-functional alkali metal siliconates and silicates.

Absorption of water by porous mineral building materials, such as concrete, sandstones, lime sandstones, gypsum, ceramics or fired clay products, examples being wall bricks, in the presence of water or moisture, may cause damage to the building materials. Renovating building materials that have been damaged in this way is very complex and costly. It is known practice to incorporate hydrophobizing agents onto the surface or into the material during the production of such building materials, in order to prevent water absorption and hence damage to the building materials. For some time, siliconates have been playing an important part here as hydrophobizing agents, especially when the building materials to be treated are not very alkaline, such as clay products.

EP 0 650 968 discloses a two-stage operation for the continuous preparation of alkali metal alkylsiliconates from alkyltrichlorosilanes via alkyltrialkoxysilanes. U.S. Pat. No. 4,281,147 describes a process for preparing aqueous alkali metal organylsiliconates by reaction of organylalkoxypolysiloxanes with NaOH or KOH. EP 0 015 366 relates to a process for preparing alkali metal methylsiliconates that are free of alkali metal chloride, by reaction of alkali metal trichlorosilanes with a base, precipitation of the intermediate by acidification, and subsequent dissolution of the washed filter cake in base.

DE 31 05 407 relates to water-repellent gypsum mortars comprising a fatty amine, an acid and an alkali metal siliconate. US 2007/0028809 discloses a gypsum composition comprising cellulose and a methyl siliconate, with the gypsum products produced therefrom having water-repelling properties.

The prior art discloses neither a composition of propyl-functional alkali metal siliconates and silicates and their cocondensates, nor a technical process for industrial manufacture of such a composition.

An object of the present invention was to provide a composition comprising water-soluble cocondensates of propyl-functional alkali metal siliconates and silicates that has hydrophobizing properties even at very high dilution and whose condensation products remain water-soluble even at high concentration. The intention, moreover, was to develop a simple and therefore economical process for preparing the compositions comprising cocondensates of propyl-functional alkali metal siliconates with silicates. The object, furthermore, was to prepare compositions of the stated compounds that are suitable for the hydrophobizing impregnation of mineral building materials, preferably surfaces of mineral building materials, and/or for hydrophobization in the bulk material in the course of its production, and also as a water-repellent injection composition to form barrier layers against moisture. The composition of the invention is used preferably to impregnate porous, mineral building materials and/or substrates. Furthermore, stable compositions were to be provided, having a high level of the compounds and being readily dilutable with water prior to their use. According to one alternative, moreover, these compositions were to be substantially free from solvents, more particularly free from alcohol.

The objects have been achieved by means of the composition of the invention as per Claims 1 and 17 and by the process of the invention in line with the features of Claim 7, and also by the inventive use according to Claim 18. Further features and combinations thereof are elucidated in the dependent claims and in detail in the description.

Surprisingly it has been possible to provide a composition which comprises substantially water-soluble block cocondensates of alkali metal propylsiliconates with alkali metal silicates and water; preferred compositions feature block cocondensates of propyl siliconates with silicate, which have been cocondensed under alkaline conditions with block condensates of silicates, and which are referred to as block cocondensates of alkali metal propylsiliconates with alkali metal silicates. The particular advantage of the block cocondensates is that particularly highly concentrated compositions of the block cocondensates dissolved therein may be prepared.

Surprisingly it has been possible to provide a composition which comprises substantially water-soluble block cocondensates of alkali metal propylsiliconates with alkali metal silicates in water, the alkali metal propylsiliconates being more particularly cocondensates derived from silanes, and the block cocondensates featuring crosslinking structural elements which form catenary, cyclic, crosslinked and/or three-dimensionally crosslinked structures, and at least one structure corresponds in idealized form to the general formula I,

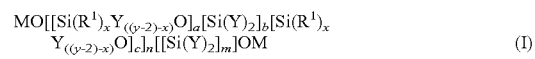

$$MO[[Si(R^1)_xY_{(y-2)-x})O]_a[Si(Y)_2]_b[Si(R^1)_xY_{(y-2)-x})O]_c]_n[[Si(Y)_2]_m]OM \qquad (I)$$

where, in the structural elements derived from alkoxysilanes and silicates, such as alkali metal silicate or synonymously alkali metal waterglass, $R^1$ corresponds to a propyl radical, Y corresponds in each case independently to OM or OH or, in crosslinked and/or three-dimensionally crosslinked structures, independently of one another, to $O_{1/2}$, i.e. in a siloxane bond, M corresponds independently at each occurrence to an alkali metal ion, preferably a monovalent alkali metal ion, such as $Na^+$ or $K^+$, or to ½ alkaline earth metal ion, such as ½ $Ca^{2+}$ or ½ $Mg^{2+}$, with in each case independently x being 1 or 2, preferably 1, with y being 3 or 4, where (x+y)=4, and also with, in each case independently, a≥1 and c≥0; preferably, independently, each c≥1, b≥0, more particularly with b≥1, preferably with 20≥b≥2, more preferably with 15≥b≥3, with n≥1 blocks, likewise preferably with n≥2, and with m≥2 silicate blocks, where (b+m)=v and (a+c)/v≥1, also in particular with v≥4, preferably with 25≥[v=(b+m)]≥2 silicate blocks, more particularly with 25≥[v=(b+m)]≥4, preferably with 10≥[v=(b+m)]≥4, alternative preference being given to 10≥[v=(b+m)]≥2, also preferably with 10≥[v=(b+m)]≥5 in the combination with (a+c)≥2, in particular with the proviso that b is less than m. Embodiments also preferred are the combinations with n≥2 and (a+c+b)≥4, with in each case independently a≥1, c≥1 and 20≥b≥1, and optionally with m≥4, in particular with 10≥v≥4 silicate blocks, alternative preference being given to 10≥b≥1, more particularly 4≥b≥1, alternatively 4≥b≥2 with n≥1 and v≥3. The index a is situated preferably in the range of 20≥a≥1, preferably 10≥a≥1, also preferably 4≥a≥1, such as 4≥a≥2. The index c is situated preferably in the range of 20≥c≥0; preferably 10≥c≥1, also preferably 4≥c≥1, such as 4≥c≥2. According to one particularly preferred alternative, in the formula I there are cocondensate blocks with in each case independently a≥1, c≥1, b≥1 with n≥1 and at the same time silicate blocks with m≥2, in particular with the proviso that m is greater than b.

The alkali metal propylsiliconates here are cocondensates derived from di- or trifunctional hydrolysable silanes and tetrafunctional silanes. With particular preference the formula I encompasses cocondensate blocks with in each case independently a≥1, c≥1, b≥1, preferably with b≥2, with n≥1 and the silicate blocks with m≥2, where b+m=v and v≥4, in particular v≥6, where (a+c)/v≥1; preferably a/v≥0.5, more preferably 0.11≥(a+c)/(b+m)≥1.0, also preferably 0.11≥(a+c)/(b+m)≥0.4, more preferably 0.16≥(a+c)/(b+m)≥0.32, also particularly preferably (a+c)/(b+m) or (a+c)/v around 0.30 with plus/minus 0.15. A particularly preferred combination comprises a≥1, c≥1, b≥2 with n≥1 and the silicate blocks with m≥2, where (b+m)=v and v≥6, and where (a+c)/v≥1, in particular with x being 1, more preferably (a+c)/(b+m) or (a+c)/v is 0.30 with plus/minus 0.15. Likewise preferred is a combination of n≥2 with b≥2 and m≥4 with a and c independently greater than or equal to 1.

Likewise provided by the invention is a composition which comprises substantially water-soluble block cocondensates of alkali metal propylsiliconates with alkali metal silicates and water, the alkali metal propylsiliconates being more particularly cocondensates derived from silanes, and the block cocondensates having crosslinking structural elements which form catenary, cyclic, crosslinked and/or three-dimensionally crosslinked structures, and at least one structure corresponds in idealized form to the general formula I, where the block cocondensates of alkali metal propylsiliconates with alkali metal silicates are present in a mixture with monomeric alkali metal propylsilanolates, more particularly derived from the general formula II, and/or alkali metal silicates, more particularly derived from the general formula III. The ratio of propyl-functional structural elements and propylsilanolates to silicatic structural elements and silicates is preferably around 1:2 to 1:4, preferably about 1:3 with in each case plus/minus 0.25, in particular with the proviso that in the idealized formula I, 10≥[v=(b+m)]≥2 in the combination with n≥1, a≥1, c≥2, i.e. (a+c)≥2, in particular with 10≥[v=(b+m)]≥4, where m≥2. Optionally, n and m in each case independently are less than or equal to 100, also preferably less than or equal to 10, particularly preferably less than or equal to 5.

Also provided by the invention is a composition comprising substantially water-soluble block cocondensates of alkali metal propylsiliconates with alkali metal silicates and water, the alkali metal propylsiliconates being, in particular, cocondensates derived from silanes, with a molecular weight average in terms of relatively high molecular weight block cocondensates, more particularly of the idealized formula I, of greater than or equal to 1100 g/mol to 2000 g/mol, with optionally a further molecular weight average in terms of low molecular weight condensates and/or monomers of propylsilanolates and silicates of less than or equal to 500 g/mol to 96 g/mol. The ratio between the relatively high molecular weight block cocondensates and the low molecular weight condensates and monomers is preferably from 1:1.1 to 1:3, preferably from 1:1.1 to 1:2.0, preferably around 1:1.6 with plus/minus 0.25.

With regard to the use as hydrophobizing agents in architectural preservation, and on the basis of workplace safety law provisions for the industrial manufacture of construction products, such as plasterboard or brick blocks, it is preferred if the compositions are substantially alcohol-free and also no longer release substantially any alcohol during crosslinking. A composition is considered alcohol-free if it has ≤5 wt % alcohol or is able to release ≤5 wt % of hydrolysis alcohol, preferably below 5 wt % to 0.000001 wt %. In general, in the compositions provided, the amount of alcohol or hydrolysis alcohol in the overall composition is ≤3 wt %, preferably ≤1 wt %. A composition is preferably considered substantially alcohol-free and/or free from hydrolysis alcohol when its alcohol and/or hydrolysis alcohol content is from preferably ≤1 ppm by weight up to a maximum of 2 wt %, preferably from 10 ppm by weight to 1 wt %, more preferably from 100 ppm by weight to 0.5 wt %, based in each case on the total weight of the composition. The substantially alcohol-free solution has a flash point of ≥100° C.

The pH of the ready-to-use compositions, which before use can easily be diluted with water in virtually any proportion, is ≥pH 9, more particularly ≥pH 11, preferably in the range from pH 12 to 14, more particularly also pH 13.

In accordance with one preferred embodiment, the composition takes the form of a solution. A solution means, preferably, a homogeneous mixture, more particularly comprising block cocondensates (solutes) and at least one solvent, presently water, the solutes being preferably in full solution in the solvent, presently water; in other words, preferably, there is a clear solution. The shelf life of the solution is at least twelve months.

Surprisingly, a simple and economical process has been found for preparing cocondensates, allowing an alkali metal cocondensates of propyl-siliconate and silicate to be prepared without costly and inconvenient reaction, using an introduction tube and operating under inert gas.

According to one alternative of the invention it has surprisingly been found that it is possible to prepare compositions of water-soluble block cocondensates of alkali metal propylsiliconates with silicates, by, in a first step, performing the preparation of the propyl-functional alkoxysilanes and optionally tetraalkoxysilanes and/or condensates thereof, such as homocondensates and/or cocondensates, starting from propylhalosilane and tetrahalosilane, in the presence of a stoichiometric amount of alcohol, preferably a molar excess of alcohol, from the halosilanes, and with possible removal of any alcohol added in excess. The resulting mixture of the aforementioned alkoxysilanes and optionally their condensates is subsequently reacted, in a second step, with a mixture of a water-soluble silicate, more particularly alkali metal silicate, in solution in aqueous alkaline solution, preferably an aqueous alkali metal hydroxide solution. This reaction of the mixture with the water-soluble silicate and the alkali metal hydroxide leads to the formation of block cocondensates of alkali metal propylsiliconates with alkali metal silicates. The hydrolysis alcohol formed in the course of the hydrolysis and condensation is removed almost completely. It was particularly surprising that as a result of the procedure according to the invention, in the second reaction step, the reaction product from the first step is reacted easily and economically, through the addition of an alkali metal silicate to the aqueous alkaline solution, without special measures and without substantial formation of sediments. In the second step as well, the hydrolysis alcohol released can be removed almost completely, without any instances of precipitation of the silicate and/or siliconate.

The invention accordingly provides a process for preparing a composition comprising at least one substantially water-soluble block cocondensate of alkali metal propylsiliconates with alkali metal silicates and water, and also to a composition obtainable by this process, by reacting (i) a mixture comprising propylalkoxysilanes and optionally propyl-functional siloxanes derived from a propylsilane of the general formula II, more particularly a mixture comprising propylalkoxysilanes, tetraalkoxysilanes and/or condensates thereof, such as cocondensates and/or homocondensates, derived from propylhalosilanes of the formula II where X is halogen and from tetrahalosilane of the formula III where Y is halogen,

$$(R^1)_x SiX_{(y-x)} \quad (II)$$

with $R^1$ independently being a propyl-functional radical, and with hydrolysable radical X, which independently is alkoxy or a halogen, more particularly substantially selected from ethoxy, methoxy, propoxy and butoxy or substantially selected from chloro and bromo, with x being 1 or 2 and y being 4, and optionally with a hydrolysable silane of the formula III

$$SiY_4 \quad (III)$$

with hydrolysable radical Y, which independently is alkoxy or a halogen, more particularly substantially selected from ethoxy, methoxy, propoxy and butoxy or substantially selected from chloro or bromo, and (ii) a mixture of at least one water-soluble silicate and an aqueous alkaline solution. It is particularly preferred here if an alkali metal silicate is used as silicate, more particularly a sodium waterglass and/or a potassium waterglass. In general it is possible to use all water-soluble silicates. Hydrolysis alcohol formed in a step (iii) is preferably removed.

In accordance with one embodiment, the aqueous alkaline solution comprises an inorganic base, more particularly selected from alkali metal hydroxide and alkaline earth metal hydroxide, particular preference being given to potassium hydroxide, sodium hydroxide, lithium hydroxide, magnesium hydroxide and/or calcium hydroxide.

It is preferred, moreover, if in the process, the mixture comprising propylalkoxysilane, more particularly of the formula II with X being alkoxy, preferably ethoxy, and optionally condensates thereof is prepared by reaction of a propylsilane of the general formula II where X is halogen, more particularly chloro or bromo, preferably chloro, with an alcohol, more particularly methanol, ethanol, propanol or butanol, preferably ethanol, optionally in the presence of water, and the alcohol and/or hydrolysis alcohol is removed. Generally, in the process of the invention, the alcohol and/or hydrolysis alcohol are/is removed by distillation, preferably under reduced pressure and at elevated temperature.

According to one particularly preferred alternative, in the process of the invention, the mixture comprising propylalkoxysilane, more particularly of the formula II where X is alkoxy, preferably ethoxy, tetraalkoxysilane, more particularly of the formula III where Y is alkoxy, preferably ethoxy, and/or condensates thereof, such as cocondensates, is prepared by reaction of at least one propylsilane of the general formula II where X is halogen, more particularly chloro or bromo, preferably chloro, and at least one hydrolysable silane of the formula III where Y is halogen, more particularly chloro or bromo, preferably chloro, with an alcohol, more particularly methanol, ethanol, propanol or butanol, preferably ethanol, optionally in the presence of water; with particular preference, reaction takes place with a molar excess of alcohol in relation to the hydrolysable groups, and the alcohol and/or hydrolysis alcohol are/is removed.

In accordance with the invention, the mixture in (ii) comprises the water-soluble alkali metal silicate, such as sodium waterglass or potassium waterglass, and an aqueous solution of one or more alkali metal hydroxides, such as potassium hydroxide or sodium hydroxide, or else of an alkaline earth metal hydroxide, such as magnesium hydroxide or calcium hydroxide; an aqueous solution of potassium hydroxide is preferred. Particularly preferred aqueous alkaline solutions contain from 5 to 60 wt % of the inorganic base, preferred solutions having a base content of 10 to 40 wt %, more preferably of 20 to 40 wt %, including all intermediate values, as for example 7, 12, 15, 17, 22, 27, 28, 30, 32, 35, 37, 42, 45, 47, 50, 52, 55, 57 wt %—to give but a few of the numerical values. Used customarily are aqueous alkaline solutions having an alkali metal hydroxide content of between 20 to 40 wt %, such as, preferably, aqueous potassium hydroxide solutions containing about 33 wt %.

The amount-of-substance ratio in terms of hydrolysable radicals, more particularly X and/or Y, in the mixture from step (i), preferably with X and Y being alkoxy, to the alkali metal hydroxide and/or alkali metal-O groups in the alkali metal waterglass used, preferably of hydroxide ions and $O^-$ ions from alkali metal hydroxide and alkali metal waterglass, is generally 1:15 to 15:1, and is preferably at or between 1:12 to 12:1, in each case including the limiting values, more preferably about 1:10 to 10:1; with particular preference the ratio is 1:8 to 8:1, likewise preferably 1:10 to 1:1, with particular preference about 1:5 to 5:1, with a fluctuation of plus/minus 0.5. Likewise with particular preference, the ratio is 1:1.5 to 1:2.0. Preference is also given to a ratio of about 1:10 with a fluctuation of plus/minus 0.5. Accordingly it is possible, for about 1 mol of hydrolysable radicals, to use up to about 10 mol, preferably up to 8 mol, of hydroxide, or else, in an alternative procedure, to use, to about 1 mol of hydrolysable groups, about 1 to 5 mol of hydroxide and $O^-$ ions, preferably 1 to 2 mol. In the case of the addition to the alkali metal hydroxide solution, the hydrolysable radicals encompass the Hal radicals and/or the alkoxy groups formed by esterification with the alcohol, more particularly of the silanes of the general formulae II and/or III and also, optionally, of the resultant propyl-functional alkali metal siliconates, silicates, and optionally resultant cocondensation products thereof.

Depending on process step, therefore, the hydrolysable radical X of the formula II is independently a methoxy, ethoxy, propoxy, butoxy, chloro and/or bromo, more particularly ethoxy or chloro, and the hydrolysable radical Y of the formula III is independently a methoxy, ethoxy, propoxy, butoxy, chloro and/or bromo, more particularly independently ethoxy or chloro.

In the process of the invention, a substantially water-soluble block cocondensate of alkali metal propylsiliconates with alkali metal silicates is preferably prepared by reacting (i) a mixture comprising propylethoxysilane and optionally propyl-functional siloxanes derived from a propylchlorosilane of the general formula II

$$(R^1)_x SiX_{(y-x)} \quad (II)$$

where $R^1$ independently is a propyl-functional radical, more particularly n-propyl and/or isopropyl, preferably n-propyl, and where X is chloro, and optionally from a tetrachlorosilane of the formula III

$$SiY_4 \quad (III)$$

where Y is chloro, with (ii) a mixture of at least one water-soluble alkali metal silicate, more particularly sodium waterglass or potassium waterglass, and an aqueous alkali metal hydroxide solution, preferably an aqueous potassium hydroxide or sodium hydroxide solution, the mixture being prepared by reaction of propylchlorosilane of the general formula II with ethanol, more particularly in excess in relation to the hydrolysable groups, optionally in the presence of water, and the excess ethanol and/or hydrolysis alcohol being removed, or, in an alternative, the mixture comprising propylalkoxysilane, tetraethoxysilane and/or condensates or cocondensates thereof is prepared by reaction of at least one propylchlorosilane, more particularly a propyltrichlorosilane, preferably an n-propyltrichlorosilane, and at least one tetrachlorosilane of the formula III, with ethanol, more particularly in excess in relation to the hydrolysable groups, optionally in the presence of water, and the excess alcohol and/or hydrolysis alcohol are/is removed.

The mixture from step (i) here, preferably immediately after its preparation, is added in step (ii) to a mixture of a water-soluble silicate in aqueous alkaline solution, and a combination comprising block cocondensates of alkali metal propylsiliconates with alkali metal silicates is obtained by reaction and cocondensation of hydrolysates of propylalkoxysilanes and tetraalkoxysilanes with block condensates of a silicate. Also preferably, the mixture from step (i) can be separated off and optionally stored, and then added in step (ii) to a mixture of a water-soluble silicate in aqueous alkaline solution.

It is further preferred here, in the process of the invention, if—alternatively or additionally to the aforementioned features—the mixture comprising propylalkoxysilane and/or—siloxanes derived from a propylhalosilane of the general formula II and optionally from a tetrahalosilane of the formula III is added to the mixture of a water-soluble silicate in aqueous alkaline solution, more particularly with intensive mixing, preferably with intensive stirring. With particular preference the mixture is added dropwise and/or with vigorous mixing to the aqueous alkaline solution.

Preferred propyl-functional silanes of the general formula II are propylhalosilanes, such as a n-propyltrihalosilane, isopropyltrihalosilane, di-n-propyldihalosilane or di-isopropyldihalosilane, such as preferably n-propyltrichlorosilane, isopropyl-trichlorosilane, di-n-propyldichlorosilane, isopropyl-, n-propyldichlorosilane or di-isopropyldichlorosilane, the skilled person also being aware of, and able to use, the corresponding brominated propylhalosilanes or those with mixed halogenation, more particularly comprising chloro and bromo.

Generally speaking, the propylsilane of the formula II and the silane of the formula III can be used in any ratio, more particularly in a ratio of 1:0 to 0.01:1, more particularly of 1:0 to 0.5 to 1. The outstanding hydrophobizing effect in combination with the good water-solubility is achieved when the propylsilane of the general formula II and the silane of the formula III are employed in a molar ratio of 1:0 to 3:1. The propylsilane of the formula II is preferably used in a ratio to the silane of the formula III of 1:1, in particular with plus/minus 0.5.

According to one particularly preferred process variant, in step (i), an esterification of halosilanes is carried out, by reaction of propylchlorosilane (PCTS) and silane tetrachloride (STC) with ethanol (EtOH):

1 mol (PTCS+STC)+3.85 mol EtOH→Fully esterified intermediate+3.5 mol HCl

Preferably 0.5 mol PTCS+0.5 mol STC+3.85 mol EtOH→Fully esterified intermediate+3.5 mol HCl Preferably removal of the excess alcohol.

Step (ii): Reaction of the intermediate from step (i) with 33.3 wt % KOH solution and 35 wt % sodium waterglass:

Fully esterified intermediate+33.3 wt % aqueous solution KOH+35 wt % sodium waterglass→block cocondensates of K propylsiliconate/silicate with silicate (waterglass)+3.5 EtOH and removal of the alcohol. A composition with very high active ingredient concentration is obtained as the direct process product.

In accordance with a process variant preferred in accordance with the invention, in step (i), a propyltrichlorosilane, of the formula II, and a tetrachlorosilane, of the formula III, are introduced as an initial charge and ethanol with a 10% molar excess in relation to the hydrolysable halogen radicals is added dropwise with stirring. After the end of the reaction, excess ethanol was removed by distillation. In step (ii) the resulting mixture was introduced dropwise with stirring by means of a metering device (without inert gas and introduction tube) into an aqueous mixture of an aqueous 33.3 wt % strength KOH solution and 35 wt % strength sodium waterglass (aqueous sodium waterglass taking account of $Na_2O$). Ethanol formed was removed by distillation in step (iii). The composition obtained has an elevated $SiO_2$ content and therefore exhibits improved performance even at very high levels of dilution. It was possible accordingly to achieve sharp improvement in the roll-off properties of the treated substrates (brick, gypsum, concrete, limestone, sand, wall plaster). Particularly good results were obtained with propylsilanes of the formula II and silanes of the formula III in a molar ratio of 1:0 to 3:1 at the testing stage.

The alcohol used in the first process step may be of technical quality with a certain water content, more particularly with 4 to 10 wt % of water, or may be a water-free alcohol. If water-containing alcohols are used, formation of alkoxysilanes may be greater in the first process step, and in the second process step they may be at least partly broken down again, whereas if water-free alcohols are used, mixtures comprising propylalkoxysilanes and optionally tetraalkoxysilanes are substantially obtained. The reaction in the first process step is carried out preferably with an excess of alcohol, and so at least some of the hydrohalic acid formed during the reaction can be removed by distillation with the alcohol.

It is therefore preferred if the alcohol is added in a molar ratio of 0.001:1 to 100:1 in relation to the hydrolysable radicals, in moles. The alcohol is used preferably in a molar ratio of 1:1 to 10:1, more preferably in a ratio of 1:1 to 1:2. With further preference about 1.1 mol of alcohol is added per hydrolysable group. In step (i) alcohol is used preferably at 1 to 200 mol %, more particularly 100 to 150 mol %, in relation to the hydrolysable radicals Si-Hal of the compounds II and III, the alcohol used being more particularly ethanol. Generally speaking it is preferred to use more than the stoichiometric amount of alcohol, such as EtOH, more particularly 100 to 110 mol %, preferably 105 to 115 mol %, more preferably around 110 mol %, based in each case on the molar amount of the hydrolysable Si-Hal bonds or hydrolysable Hal radicals on silicon atoms, preferably of the general formulae II and III.

Surprisingly it has been found that the reaction succeeds reliably if the mixture from step (i), the reaction product, is mixed with an aqueous solution which has been rendered strongly alkaline and comprises a water-soluble silicate; more particularly, the solution ought to contain at least an equimolar amount of alkali, preferably hydroxide ions and/or —$O^-$, in relation to the hydrolysable radicals Si-alkoxy and/or Si-Hal of the silanes of the formulae II and III, preference being given to 1 to 2 mol of hydroxide ions per mole of hydrolysable radical. In that case the formation of solid silicatic particles or deposits can be prevented to particularly good effect. A particular feature of this process is that the mixture from step (i) can be added dropwise directly in step (ii) to a mixture of an alkali metal silicate in aqueous alkaline solution; more particularly, the mixture from step (i) is introduced in portions, preferably dropwise with mixing, such as stirring, into the solution. Particular measures to prevent the formation of precipitates are not necessary, in contrast to the situation with a process necessarily involving direct jetting into the solution, since the alkali metal silicates in the initial charge make a contribution to solubilizing the mixture that is added dropwise. The particular advantage of the invention is manifested in the direct formation, according to the process, of clear aqueous solutions with no instances of sedimentation or precipitation.

In accordance with the invention, in step (iii), the resulting composition is freed from the hydrolysis alcohol and any added alcohol, and may be diluted further with water as and when required. The alcohol and/or hydrolysis alcohol are/is preferably removed by distillation. The active ingredient concentration may likewise be adjusted to a desired level by addition of water and removal of hydrolysis alcohol. It is possible for water to be added to the same extent that alcohol and/or hydrolysis alcohol are/is removed. The desired active ingredient concentration can also be reduced as desired by addition of water. Generally speaking, however, the alcohol-containing composition obtained, or the composition after removal of the alcohol, is already usable and suitable for application, without addition of water. An advantage of the purely aqueous, alcohol-free composition is its reduced VOC content in the subsequent application. In accordance with the invention, the alcohol is removed from the solution by distillation to give a VOC-reduced solution which is directly usable and can be diluted further with water easily as and when required.

According to one particularly preferred process variant, in the process of the invention, a substantially water-soluble block cocondensate of alkali metal propylsiliconates with alkali metal silicates is preferably prepared by preparing in step (i) a mixture comprising propylethoxysilane, tetraethoxysilane and optionally propyl-functional siloxanes, by reacting a propyltrihalosilane of the general formula II, preferably propyltrichlorosilane, and a tetrahalosilane of the formula III, preferably tetrachlorosilane, employed in particular in a molar ratio of 1:0.5 to 3:1, preferably approximately in a molar ratio of 1:1, with an alcohol, preferably ethanol, the alcohol, preferably ethanol, being used in a molar excess in relation to the hydrolysable halogen radicals of the formulae II and III, preferably in about 20% molar excess, preferably in 10% molar excess, with unreacted alcohol being removed by distillation thereafter; and in step (ii) the mixture prepared in (i) is reacted with a mixture of at least one water-soluble alkali metal silicate, more particularly sodium waterglass or potassium waterglass, and an aqueous alkali metal hydroxide solution, preferably an aqueous potassium hydroxide or sodium hydroxide solution, the mixture containing preferably 1 to 5 mol, more preferably 1 to 2 mol, of alkaliO/hydroxide groups per hydrolysable alkoxy group, and in step (iii) the hydrolysis alcohol formed is removed by distillation. AlkaliO is considered to be the alkaliO groups in the alkali metal waterglass.

Generally speaking, the composition, more particularly the alcohol-free composition, can be adjusted directly during its preparation to a level of block cocondensates of alkali metal propylsiliconates with alkali metal silicates of 1 to 80 wt %, and to all values in between, based on the total weight of the composition—it is directly ready for use—it may preferably be adjusted to a level of 1 to 60 wt % in relation to the overall composition, alternatively to 30 to 60 wt %, more preferably to 40 to 60 wt % or else to 45 to 55 wt %. The active ingredient content or level is the amount of block cocondensates, taking into account the alkali metal ions, or alkali metal oxides and charge-neutral compounds, i.e. the amount of the alkali metal siliconate and alkali metal silicate block cocondensates and of the alkali metal silanolates and alkali metal silicates.

According to the process of the invention it is possible, therefore, to prepare very highly concentrated compositions. These highly concentrated compositions are stable on storage, preferably over 6 months, more preferably around 12 months. As and when necessary, the composition may be diluted prior to use, i.e. a purely aqueous, substantially alcohol-free composition, with water and/or with an organic solvent, to a level of block cocondensates of alkali metal propylsiliconates with alkali metal silicates of 1 to 60 wt % in relation to the overall composition, and to all values lying in between, preferably to 1 to 30 wt %, or preferably to 1 to 20 wt %, more preferably to 1 to 10 wt %, and also to 1 to 5 wt %.

The level is also directly related to the mineral building material employed and/or to the type of application. For instance, for application to surfaces, solutions with a low level may be suitable, and, for example, in the case of hydrophobizing in the bulk material, solutions with a high level may be suitable, especially in the case of the hydrophobizing of gypsum-containing mineral building materials. Highly concentrated compositions may likewise be preferred, if water in the form of make-up water is already added during hydrophobizing in the bulk material. Generally speaking, the active ingredient content (of block cocondensates, taking account of alkali, alkali metal silanolates and alkali metal silicates) can also be from or between 1 to 10 wt % in the composition, or, depending on application, 1 to 5 wt %, 5 to 10 wt %, 10 to 15 wt %, 15 to 20 wt % or 20 to 30 wt %, or else 30 to 40 wt %, or from or between 40 to 60 wt %. The $SiO_2$ content of the overall composition, in the prepared or ready-to-use composition, is preferably 5 to 30 wt %, more particularly 8 to 20 wt %, preferably 10 to 15 wt %, more preferably 12 to 14 wt %. The $SiO_2$ content may be determined by methods known to the skilled person. During the preparation of the mixture of propylsilane of the formula II, the silane of the formula III and alcohol or alcohol/water mixture, the temperature rises in step (i) as a consequence of reaction. In accordance with the process, the temperature in step (i) ought not to exceed 80° C., and with particular preference the temperature is not to exceed 60° C.; cooling is carried out where appropriate. In step (ii) as well, there is some reaction-induced increase in the temperature, but it is not to exceed 60° C., preferably 50° C.; in other words, where appropriate, cooling takes place in step (ii), or the mixture from step (i) is introduced more slowly, in portions, into the mixture of step (ii). In step (iii), preferably, the alcohol and/or hydrolysis alcohol are/is removed, more particularly under reduced pressure in a manner such that the temperature does not rise above 80° C., preferably not above 60° C.

In the process of the invention, in step (i), the alcohol and/or in step (iii) the alcohol/hydrolysis alcohol, are/is removed, more particularly the alcohol/hydrolysis alcohol is removed by distillation, preferably under reduced pressure and at elevated temperature. Distillation takes place preferably at below 300 mbar, more preferably below 180 mbar, preferably in each case less than or equal to 10 mbar and more particularly at about 50° C.

In the case of the introduction of the mixture from step (i) into the mixture in step (ii) comprising alkali metal silicates and alkali metal hydroxide ions; as structural elements, i.e. as block condensates $MO[Si(Y)_2]_mOM$, also identified as block condensates B; in an aqueous solution there may be formation of propyl-functional alkali metal siliconates, such as $MO[Si(R^1)_xY_{(y-2)-x)}O]_aM$ of the idealized formula IV or $MO[Si(R^1)_xO^-_{(y-2)-x)}O]_aM+M_a$ of the idealized formula IVa, and $MO[Si(R^1)_xY_{(y-2)-x)}O]_cM$ of the idealized formula IVb or MO[Si($R^1$)$_x$O$^-_{(y-2)-x)}$O]$_c$M+M$_c$ of the idealized formula IVc, alkali metal silicates, such as MO[Si(Y)$_2$]$_b$OM of the idealized formula V, and cocondensation products thereof. These propyl-functional alkali metal siliconates of the formulae IV, IVa, IVb and IVc and alkali metal silicates in the formula V, depicted in idealized form, may form homocondensates and/or cocondensates, as shown in idealized form in the general formula I as MO[[Si($R^1$)$_x$Y$_{(y-2)-x)}$O]$_a$[Si(Y)$_2$]$_b$[Si($R^1$)$_x$ Y$_{(y-2)-x)}$O]$_c$]$_n$M (I), with M being present in the composition in a number such that the block cocondensate is charge-neutral. In the case of formation of homocondensates, a is greater than or equal to 1, c is greater than or equal to 0 and b is 0, or a is 0, c is 0 and b is greater than or equal to 1. In the case of formation of cocondensates, a and b are greater than 1 and c is greater than or equal to 0, preferably greater than or equal to 1. These homocondensates and/or cocondensates are identified as block condensates A, and the silicate blocks are identified as block condensates B, and according the general formula I may also be represented as MO[A]$_n$[B$_m$]OM (I), or as

In accordance with the process of the invention, preferably in the case of the reaction at elevated temperatures, block cocondensates are formed which have blocks of cocondensates derived from propylalkoxysilanes and tetraalkoxysilanes, which undergo condensation with alkali metal silicate blocks that are present in the mixture. Because of the inventively adjusted pH in step ii, a defined molecular weight of the alkali metal silicates (alkali metal waterglass) is formed at the same time under the process conditions, and these silicates are then able to react with the cocondensates. It is therefore assumed that in view of the specific procedure in step (ii), block cocondensates are formed in line with the formula I depicted in idealized form, with $R^1$ being n-propyl or isopropyl and each Y independently being O$_{1/2}$ in a siloxane bond or OH or OM, where M is a monovalent alkali metal ion, such as Na$^+$ or K$^+$, or ½ an alkaline earth metal ion, such as ½ Ca$^{2+}$, in —ONa, —OK, or optionally hydrogen for —OH, with x, y, a, c and b being as defined above, the ratio (a+c)/(b+m) being preferably less than 1, and being situated more particularly in the range from 0.11 to 0.5.

Likewise provided by the invention is a composition obtainable by the process of the invention, comprising a water-soluble block cocondensate of alkali metal propylsiliconates with alkali metal silicates, with a pH≥11, the pH more particularly being 14. Likewise provided by the invention is a composition obtainable by the process of the invention that is substantially alcohol-free and/or that has preferably block cocondensates of alkali metal propylsiliconates with alkali metal silicates, more preferably sodium silicate, potassium silicate, and more particularly the block cocondensates of alkali metal propylsiliconates with alkali metal silicates are present in a mixture with monomeric alkali metal propylsilanolates and/or alkali metal silicates.

The invention further provides the use of a composition of the invention or of a composition prepared by the process of the invention for the hydrophobizing of wood, cellulosic building materials and/or lignocellulosic building materials, for the hydrophobizing of mineral building materials, for the hydrophobizing of the surface of mineral building materials and/or for the hydrophobizing of mineral building materials in the bulk material. The use of the composition here may be used for hydrophobizing a part of the mineral material or else for hydrophobizing the entire mineral building material, in each case encompassing concrete, screed, plaster, gypsum, mortar, loam, clay, sand, ceramic, terracotta, lime sandstone, natural stone, such as sandstone, marble, granite, and also articles consisting thereof or articles comprising them, such as shaped parts, which comprise, for example, pipes, bricks, paving slabs, walls, tiles, garden containers, roof tiles, and also further customary mineral building materials known to the skilled person, and articles composed of these building materials. Likewise provided by the invention is the use of a composition of the invention as an injection composition for forming barrier layers, more particularly for forming horizontal and/or vertical barrier layers in masonry constructions or floors. The injection composition may be injected without pressure or with pressure into drilled holes. The barrier layers produced accordingly provide effective protection from rising damp in the masonry.

The examples which follow provide further elucidation of the process of the invention and of the inventive use, without confining the invention to these examples.

EXAMPLES

Determination of the Molecular Weight

Molar masses or the molecular weight and also the molar mass distribution may be determined by gel permeation chromatography (GPC). One of the publications to give a comprehensive description of the GPC analysis method is "Modern Size-Exclusion Liquid Chromatography", Andre Striegel et al, Wiley & Sons, 2nd Edn. 2009. Polyethylene oxide/polyethylene glycol, for example, can be used as standards to calibrate the method. The polydispersity (D) is the ratio of Mw/Mn. The weight average of the molecular weight (Mw) is defined as:

$$M_w = \frac{\sum n_i M_i^2}{\sum n_i M_i}$$

and the number average of the molecular weight (Mn) is defined as:

$$M_n = \frac{\sum n_i M_i}{\sum n_i}$$

where in each case:
$n_i$=molar amount [mass] of the i-mer
$M_i$=molar mass of the i-mer Details relating to the definition of weight average and number average, which are known per se to the skilled person, may alternatively be found by the reader in locations including the Internet, at http://de.wikipedia.org/wiki/Molmassenverteilung, or in a standard work of mathematics.

Example 1

Preparation of an Approximately 50% Strength Aqueous Solution of K Propylsiliconate/Silicate Step (i): A 500 ml round-bottomed flask with stirrer, reflux condenser and dropping funnel was charged with 100 g of a 1:1 mixture (based on the molar composition) of propyltrichlorosilane and tetrachlorosilane. With vigorous stirring, 102.2 g of ethanol were slowly added dropwise. The temperature rose during the addition. However, it ought not to rise above 60° C. Where necessary, counter-cooling was carried out. Following complete addition of the ethanol, stirring was continued for 30 minutes more, and the resulting intermediate was used further directly. The excess ethanol was distilled off overhead.

Step (ii): A 1000 ml round-bottomed flask with stirrer, reflux condenser and dropping funnel was charged with 311 g of a 33.3% strength aqueous KOH solution and 108 g of 35% strength sodium waterglass. A dropping funnel was charged with 100 g of the product from the first reaction step. The intermediate was then added dropwise with vigorous stirring to the KOH/sodium waterglass mixture. Following complete addition, a slightly turbid product was obtained. It was stirred further at 50° C. for 30 minutes. The ethanol formed was removed by distillation. This gave a clear product of low viscosity.

GPC analysis: Fraction of relatively high molecular mass block cocondensates with $M_w$ around 1200 g/mol with D=1.0 ($M_n$=1.1×10$^3$ g/mol) at about 62.1%, and a further fraction of low molecular mass silicates and/or silanolates with $M_w$ around 110 g/mol with D=1.1 ($M_n$=1.1×10$^2$ g/mol) at about 37.9%. The overall molecular weight average $M_w$ is around 760 g/mol with D=5.3 ($M_n$=1.4×10$^2$ g/mol). $^{29}$Si NMR: about 24.2% $C_3H_7$—Si(O$^-$)$_3$, about 75.8% Si(O$^-$)$_4$.

Comparative Example 2

Around 54% of potassium methylsiliconate solution (corresponding to around 34% of methylsiliconate solution without taking account of around 20 wt % $K_2O$).

Tests on the Reaction Products from the Examples:

The reaction products from Example 1 and from Comparative example 2 were used in a 1:20 dilution with water. Solid Poroton full-brick cubes with an edge length of 50 mm were conditioned at 25° C. and 60% relative humidity for 24 hours and then immersed for 5 seconds into the diluted preparations from Example 1 and Comparative example (C-example) 2. Adhering moisture was removed by gentle dabbing of the surfaces with a paper cloth. The treated specimens were subsequently stored at 25° C. and 60% relative humidity for 14 days in a manner which allowed air to enter from all sides. The reduction in water absorption by these specimens was determined in accordance with DIN EN 13580. The percentage reduction here was calculated by comparison with an untreated specimen of the same kind. Table 1 below shows consumption quantities and also reduction in water absorption, and Henkel test results.

The roll-off effect was determined by using a Pasteur pipette to place approximately 1 ml of DI water on the hydrophobized specimen. After 10 minutes, the drop of water was shaken off and the degree of wetting was assessed visually (ratings: 0=water rolls off, 1=no wetting, 2=half of contact area wetted, 3=entire contact area wetted, 4=dark coloration of the contact area, drop imbibed to some extent, 5=dark coloration of the contact area, drop imbibed 50%, 6=dark coloration of the contact area, drop imbibed fully).

TABLE 1

Reduction in water absorption and Henkel test of brick treated with products from the examples.

| Application | Substrate | Application rate [g/m$^2$] | Reduction in water absorption [%] | Henkel test Ratings |
|---|---|---|---|---|
| Product from Example 1 | Brick | 427 | 87.3 | 0 |
| Product from C - Example 2 | Brick | 423 | 83.1 | 4 |

It is clearly apparent that it was possible to achieve a further reduction in water absorption in conjunction with a significantly enhanced Henkel test outcome.

Additionally, cylindrical plaster specimens were produced from a commercial plaster from Knauf, with a water-to-plaster ratio of 0.5. Added to the aqueous plaster slurry were 1, 2 or 3 wt % (relative to the plaster powder) of the reaction product from Example 1 (neat) and 3 wt % from comparative example 2 (neat). The plaster specimens had a diameter of 50 mm and a height of 25 mm and were cast in PE forms. The plaster specimens were cured at 25° C. and 60% relative humidity for 28 days, and the form work was removed after 2 days under these conditions. Subsequent storage was carried out in a manner which allowed air to circulate freely from all sides. The water absorption was determined in accordance with DIN EN 520. The results can be seen from Table 2 below.

TABLE 2

Water absorption of plaster specimens

| Plaster specimen | Water absorption [%] |
|---|---|
| Untreated | 17.8 |
| Plaster specimen + 1 wt % of product from Example 1 | 11.1 |
| Plaster specimen + 2 wt % of product from Example 1 | 0.7 |
| Plaster specimen + 3 wt % of product from Example 1 | 0.2 |
| Plaster specimen + 3 wt % of product from Comparative example 2 | 0.5 |

It is clearly apparent that the product of the invention exhibits greatly improved performance relative to the known product, not only on bricks but also in plaster, as bulk material hydrophobization.

The invention claimed is:

1. A composition, comprising:
   a water-soluble block cocondensate of at least one alkali metal propylsiliconate with at least one alkali silicate and water,
   wherein
   the block cocondensate has crosslinking structural elements which form catenary, cyclic, crosslinked and/or three-dimensionally crosslinked structures, and
   at least one structure corresponds to formula I,

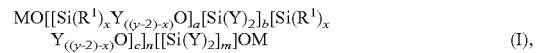

where
   $R^1$ is a propyl radical,
   each Y is independently OM or OH, or $O_{1/2}$ in crosslinked and/or three-dimensionally crosslinked structures, each
   M is independently an alkali metal ion,
   each x is independently 1 or 2, each y is independently 3 or 4, where (x+y)=4, and
a≥1, c≥0, b≤0, n≥1, m≥2, where (b+m)=v and (a+c)/v≤1,
wherein the block cocondensate is present in a mixture with at least one monomeric alkali metal propylsilanolate and at least one alkali metal silicate.

2. The composition according to claim 1,
wherein
b≥1, and
independently at each occurrence c≥1.

3. The composition according to claim 1,
wherein, independently at each occurrence:
a≥1,
c≥1,
b≥1,
n≥1,
m≥2,
(b+m)=v and v≥4, and
(a+c)/v≤1.

4. The composition according to claim 1,
wherein
the composition is substantially alcohol-free and no longer releases substantially any alcohol during crosslinking.

5. A process for preparing a composition of claim 1, the process comprising:
(i) reacting a mixture comprising propylalkoxysilane and optionally propyl-functional siloxanes derived from a propylsilane of formula II

where $R^1$ is independently a propyl-functional radical, X is independently alkoxy or a halogen, x is 1 or 2 and y is 4, and optionally from a hydrolysable silane of formula III

where Y is independently an alkoxy or a halogen, and
(ii) reacting a mixture of at least one water-soluble silicate and an aqueous alkaline solution,
thereby obtaining the composition, which comprises a substantially water-soluble block cocondensate of at least one alkali metal propylsiliconate with at least one alkali metal silicate and water.

6. The process according to claim 5,
wherein
the water-soluble silicate is an alkali metal silicate.

7. The process according to claim 5,
wherein
the aqueous alkaline solution comprises an alkali metal hydroxide.

8. The process according to claim 5,
wherein
in said reacting (i),
a mixture comprising propylalkoxysilane and optionally—a siloxane is prepared by reacting a propylsilane of formula II, where X is halogen, with an alcohol, optionally in the presence of water, and removing the alcohol and/or hydrolysis alcohol,
or
a mixture comprising propylalkoxysilane, tetraalkoxysilane, and optionally a cocondensate thereof is prepared by reacting at least one propylsilane of formula II, where X is halogen, and at least one hydrolysable silane of formula III, where Y is halogen, with an alcohol, optionally in the presence of water, and removing the alcohol and/or hydrolysis alcohol.

9. The process according to claim 5,
wherein
X of formula II is independently a methoxy, ethoxy, propoxy, butoxy, chloro, or bromo, and
Y of formula III is independently a methoxy, ethoxy, propoxy, butoxy, chloro, or bromo.

10. The process according to claim 5,
wherein
a mixture derived from a propylhalosilane of formula II and optionally from a tetrahalosilane of formula III is added to the mixture of a water-soluble silicate in the aqueous alkaline solution.

11. The process according to claim 5,
wherein
the propylsilane of formula II and the silane of formula III are used in a molar ratio of from 1:0 to 3:1.

12. The process according to claim 8,
wherein
the alcohol is added in a molar ratio of from 0.001:1 to 100:1 relative to hydrolysable radicals.

13. The process according to claim 5,
wherein
hydrolysis alcohol formed in said reacting (i) is removed.

14. The process according to claim 5,
wherein
a fraction of the water-soluble block cocondensate in the composition is from 1 to 60 wt %, based on a total weight of the composition is optionally adjusted by addition of water.

15. The composition according to claim 1, which has a pH≥11.

* * * * *